June 19, 1934.  P. MORIN  1,963,173
RETRACTOR
Filed Jan. 3, 1933
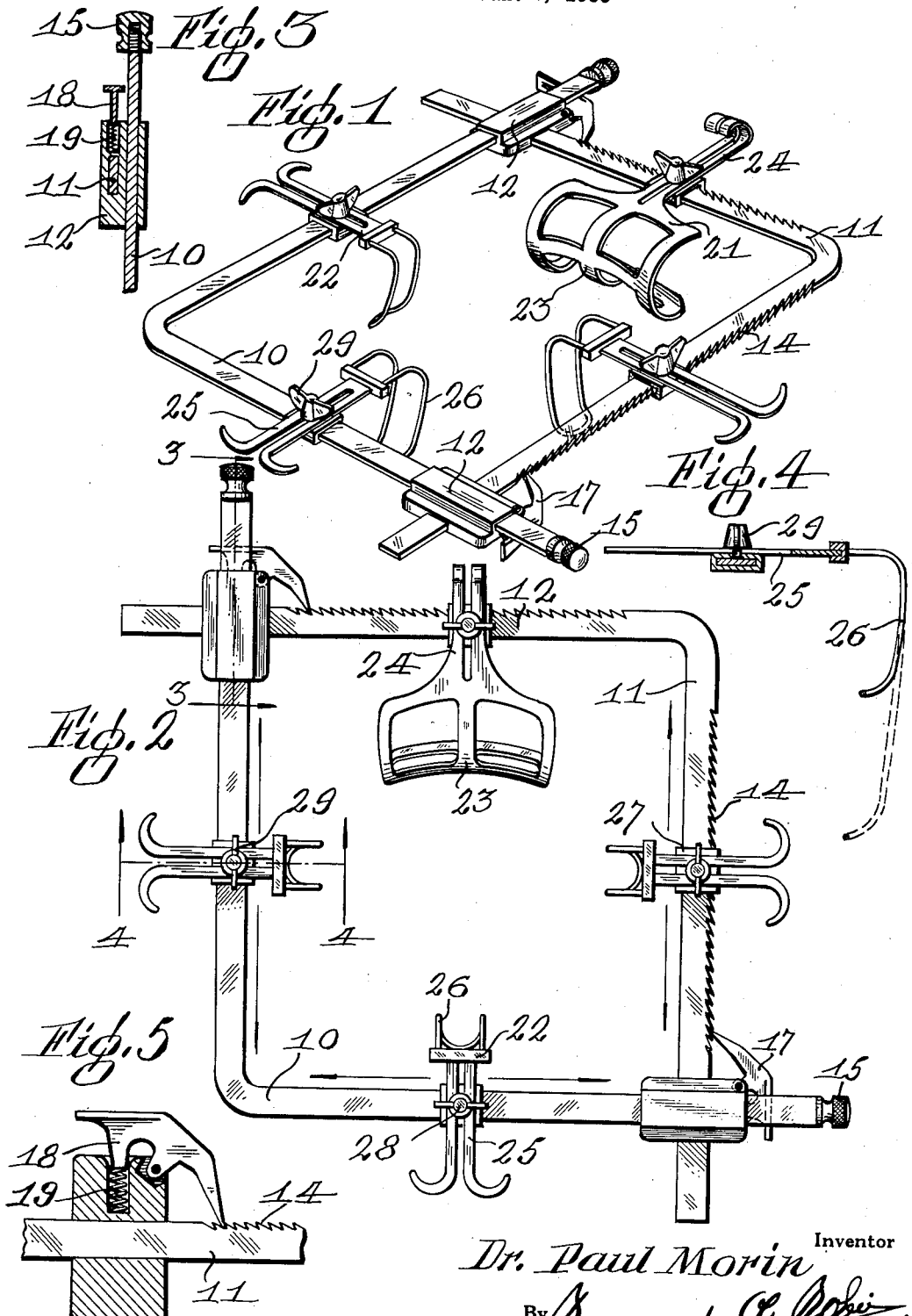
Dr. Paul Morin, Inventor Patented June 19, 1934

1,963,173

UNITED STATES PATENT OFFICE 1,963,173

RETRACTOR

Paul Morin, St. Hyacinthe, Quebec, Canada, assignor of one-half to Horace Lauzon, Valleyfield, Quebec, Canada Application January 3, 1933, Serial No. 649,882

2 Claims. (Cl. 128—20)

The present invention relates to improvements in surgical appliances and more particularly to what are known as retractors.

An important object of the invention is the provision of a surgical retractor designed so as to enable rapid and convenient adjustment in accordance with particular operating conditions.

A further object of the invention is the provision of a retractor apparatus constructed so as to afford desirable visibility of as well as convenient access to organs to be treated.

Another object of the invention is the provision of a retractor apparatus embodying an extensible frame and a plurality of readily adjustable retractor elements associated with the frame.

Still another object of the invention is the provision of a retractor of the above character which is relatively simple and compact in construction.

Other objects and advantages of the invention will become apparent as the description progresses.

In the accompanying drawing forming a part of this specification and in which like reference characters are employed to designate corresponding parts throughout the same:

Figure 1 is a perspective view of the appliance with the frame in extended adjustment, Figure 2 is a top plan view of the same, Figure 3 is a longitudinal fragmentary section taken on the line 3—3 of Figure 2, Figure 4 is a transverse section taken on the line 4—4 of Figure 2, and Figure 5 is a horizontal section through one of the frame connecting members.

Referring to the drawing, wherein for the purpose of illustration is shown a preferred embodiment of the invention, the numerals 10 and 11 designate a pair of complementary frame sections slidably associated with connecting members 12 to provide an extensible skeleton frame. The sections 10 and 11 embody, in the present instance, flat right angularly bent bars disposed in overlying positions to form the diagonally opposed parts of a right angle. Each leg of the section 11 is serrated at the outer edge to provide ratchet teeth 14. The complementary section 10 is formed, at each end, with an extended threaded shank carrying thereon a stop nut 15.

The frame connecting members 12 are in the form of elongated plates provided with through passages arranged at offset planes and extending at right angles to one another so as to slidably receive therein the crossed legs of the respective frame sections. Pivotally connected to the outer end of each frame connecting member 12 is an angular pawl 17 formed to provide a tapered projection at one end engageable with the ratchet teeth 12 of the frame and, at the opposite end, a depression shoulder for releasably swinging the pawl. As shown to advantage at Figure 5, a lug 18 attached to the pawl is disposed to project into an opening in the connecting member and contacts with a coiled compression spring 19 disposed in the opening. Thus, the spring acts to swing the pawl into ratchet engaging position. By manually forcing the depression portion of the pawl inwardly toward the connecting member, the spring 19 may be compressed and the pawl swung to a ratchet disengaging position.

To the legs of the respective frame sections are adjustably connected a plurality of retractor holders, in the present instance embodying a master holder 21 and a plurality of auxiliary holders 22. The master holding device 21 embodies a skeleton holder body 23, curved longitudinally as well as in cross section, suitable to engage the edges of the spring about an incision or other parts of the anatomy. Formed integral with and extending from the edge of the body 23 is a slotted arm 24.

The auxiliary holder members 22 preferably embody elongated slotted arms 25 and wire holding hooks 26 attached to the inner ends of the arms.

Each of the holding members is attached to a bracket 27 slidably arranged on the various side arms of the frame, a screw shank 28 projecting from each bracket and a wing-nut 29 being threadedly disposed on each shank. The arms 24 and 25 of the holders, provided with longitudinally extending slots, are disposed on the brackets 27 with the screw shank extending through the slot. The wing nuts 29 serve to releasably fasten the arms in adjusted position on the brackets.

As shown at Figure 4, the hooks 26 attached to the ends of the holders 22 may be of variable length in order to adapt the appliance to varying operating conditions.

In use, the holders 21 and 22 are initially disposed in approximately correct positions on the frame sections in accordance with the contemplated operation. The frame is arranged in a relatively contracted form. When the holders have been arranged against the edges of an incision, the frame sections are extended by merely spreading the two angular sections thereof to thereby enlarge the incision and to form an opening of the desired contour. The ratchet mechanism of the frame will, as is readily apparent from the drawings, operate to automatically fasten the frame in an extended arrangement, that is, automatically cause engagement of the pawls with the ratchet teeth to avoid contraction of the frame.

On completion of the operation, the frame may be contracted by depressing the outer ends of the pawls 17 and the springs 19, disengaging the pawls from the ratchet teeth and enabling the sections to slide to a contracted arrangement.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. A retractor comprising a pair of right angular frame sections, slidable connecting members joining the sections in adjustable quadrilateral formation, ratchet teeth formed on the frame, ratchet engaging pawls attached to the connecting members, the said pawls being disposed to normally engage the ratchet teeth and to automatically fasten the frame against contraction, means for selectively releasing the pawls, and a plurality of holders slidably and pivotally connected with the frame.

2. A retractor comprising a pair of right angular frame sections, slidable connecting members joining the sections in adjustable quadrilateral formation, ratchet teeth formed on the frame, ratchet engaging pawls attached to the connecting members, the said pawls being disposed to normally engage the ratchet teeth and to automatically fasten the frame against contraction, means for selectively releasing the pawls, and a plurality of curved holders connected with the frame so as to enable slidable and pivotal adjustment thereof on the frame.

PAUL MORIN.